US009796219B2

United States Patent
Chong et al.

(10) Patent No.: US 9,796,219 B2
(45) Date of Patent: Oct. 24, 2017

(54) WIRELESS TIRE MONITORING SYSTEM

(71) Applicant: SALUTICA ALLIED SOLUTIONS SDN. BHD., Ipoh, Perak (MY)

(72) Inventors: Kean Hoo Chong, Ipoh (MY); Wee Yeoh Tan, Ipoh (MY); Chang Tih Ho, Ipoh (MY); Yoon Shing Pan, Ipoh (MY)

(73) Assignee: SALUTICA ALLIED SOLUTIONS SDN. BHD., Ipoh (MY)

( * ) Notice: Subject to any disclaimer, the term of this patent is extended or adjusted under 35 U.S.C. 154(b) by 0 days.

(21) Appl. No.: 15/319,777

(22) PCT Filed: Jun. 16, 2015

(86) PCT No.: PCT/MY2015/000048
§ 371 (c)(1),
(2) Date: Dec. 17, 2016

(87) PCT Pub. No.: WO2015/194932
PCT Pub. Date: Dec. 13, 2015

(65) Prior Publication Data
US 2017/0136834 A1 May 18, 2017

Related U.S. Application Data

(63) Continuation of application No. PCT/MY2014/000186, filed on Jun. 19, 2014.

(51) Int. Cl.
*B60C 23/00* (2006.01)
*B60C 23/04* (2006.01)

(52) U.S. Cl.
CPC ...... *B60C 23/0433* (2013.01); *B60C 23/0479* (2013.01)

(58) Field of Classification Search
CPC .................. B60C 23/0479; B60C 23/0423
(Continued)

(56) References Cited

U.S. PATENT DOCUMENTS 6,825,758 B1 * 11/2004 Laitsaari ............. B60C 23/0433
116/34 R
2002/0030592 A1 * 3/2002 Hakanen ............. B60C 23/0408
340/442
(Continued)

FOREIGN PATENT DOCUMENTS

JP  2003-178219 A  6/2003
JP  2005-219548 A  8/2005
(Continued)

Primary Examiner — Phung Nguyen
(74) Attorney, Agent, or Firm — Maschoff Brennan

(57) ABSTRACT

The present invention relates to a wireless tire monitoring system for a vehicle. Accordingly, the wireless tire monitoring system (100a) includes: a) at least one sensor unit (200a) disposed at each tire of the vehicle for measuring at least one parameter relating to the condition of the tire; b) a mobile communication unit (400a) in communication with the sensor unit (200a), or in-car unit (300a) or other associated units, components/devices (if any), and distinct server/storage media/internet cloud (500a); c) a distinct server/storage media/internet cloud (500a) for storing all information relating to encryption key, user information/identities, or the parameters concerning to the condition of the tire measured by the sensor unit (200a); wherein the tire monitoring system (100a) is adapted to efficiently transmitting, storing, receiving/retrieving, pairing, sharing and/or broadcasting encryption data or other related information within the associated units, components/devices with the distinct server or storage media or the internet cloud (500a), in a parallel communication. It will appreciated that the system may optionally provide with an in-car unit (300a) in communication with the sensor unit (200a) or other associ- (Continued)

ated units, components/devices (if any), the mobile communication unit (400*a*) and distinct server/storage media/internet cloud (500*a*).

14 Claims, 5 Drawing Sheets

(58) Field of Classification Search
USPC ............ 340/447, 446, 448, 442, 426.1, 438, 340/426.16
See application file for complete search history.

(56) References Cited

U.S. PATENT DOCUMENTS

| | | | |
|---|---|---|---|
| 2006/0071766 A1* | 4/2006 | O'Brien | B60C 23/0408 340/442 |
| 2006/0208865 A1 | 9/2006 | Quach et al. | |
| 2012/0126967 A1* | 5/2012 | McCormick | B60C 23/0408 340/445 |
| 2012/0139751 A1 | 6/2012 | Lin | |
| 2013/0335233 A1* | 12/2013 | Kamar | A61B 5/0002 340/870.01 |
| 2014/0107864 A1* | 4/2014 | Cecchini | G06F 17/00 701/2 |
| 2015/0321605 A1* | 11/2015 | Mirza | B60R 1/00 348/148 |

FOREIGN PATENT DOCUMENTS

| | | |
|---|---|---|
| JP | 2005-319870 A | 11/2005 |
| JP | 2006-232031 A | 9/2006 |
| JP | 2009-113507 A | 5/2009 |
| JP | 2011-519762 A | 7/2011 |
| JP | 2012-022433 A | 2/2012 |
| JP | 2012-252462 A | 12/2012 |
| JP | 2013-082381 A | 5/2013 |
| JP | 2013-248916 A | 12/2013 |

* cited by examiner

WIRELESS TIRE MONITORING SYSTEM

FIELD OF INVENTION

The present invention relates generally to a wireless tire monitoring system, and more particularly to a wireless tire pressure/temperature monitoring system for a vehicle, and such monitoring system is capable of transmitting, storing, receiving/retrieving, pairing, sharing and/or broadcasting encryption data or other related information within associated units, components/devices.

BACKGROUND OF INVENTION

Arriving at the destination conveniently and safely is significantly important for the consumer group who own automobiles. Various types of automobiles or vehicles have become prerequisite traffic means or transporting equipment in the modern society. As a result, people are paying more and more attention to the safety in driving a vehicle.

One of the factors that affects the safety of driving is the functionality and proper operation of vehicle's components (such as braking system, tires, ignition system), which is the most important link. In terms of tires, factors that affect the safety include tire pressure and tire temperature in addition to the grooves of the tire surface. As such, the tire pressure and temperature detection are very important for a vehicle.

For example, if the tire pressure is 80% lower than the normally required tire pressure over a long period of time, the tire tends to have a dramatic temperature rise that may result in a blowout when the vehicle is moving at a high speed. If the tire pressure is too high or insufficient, it will cause damage to the tires.

Accordingly, should the tire pressure be 25% higher than a standard tire pressure value; the usable life of the tire will be shortened by 15%-20%; and when the tire pressure is 25% lower than the standard value, the usable life of tire shortens by 30%. Properly inflated tires not only have enhanced performance and safety in use, but also save more fuel and have prolonged tire life.

However, according to statistics, 20% of the currently being used vehicles have insufficiently inflated tires. Moreover, tire temperatures also have important influence on safe driving. The higher the tire temperature is, the lower the tire strength is. That is, tires with high tire temperature are more easily deformed. Moreover, the tire wearing increases by 2% when the tire temperature rises by 1° C.

Only when the tire pressure is at the right amount can the tire achieve its optimal performance. When the tire pressure is too high, the friction of the tire when rolling becomes small. However, because the contact area between the tire and the ground is shortened, the middle of the tire is worn out quickly. Because the tire's surface tension expands, it creates damages as well as cracks. On the other hand, when the tire pressure is insufficient, the friction of the tire when rolling becomes great, gas consumption increases, and the wear and tear on both sides of the tire increases relatively. As such, it increases the tire temperature and causes surface or ply of the tire to exfoliate or delaminate easily. When the tire is overheated, a blow-out may occur.

To ensure safe driving, various types of tire pressure monitoring systems have been developed. Some prior arts teach the incorporation of sensors, either to the tire proper or in proximity thereof, for measuring an operational parameter of the tire. Once the parameter is measured, it is transmitted to a terminal at a remote location, such as for example a maintenance facility, or to a monitor fixedly mounted to the vehicle. Accordingly, the prior art teaches that particular types of interrogators and transmitters have to be designed for a remotely located facility in order for the remote facility to receive information from the tires of the vehicle. In order to be able to provide information relating to the tires to the driver of the vehicle, a special apparatus has to be either incorporated to the vehicle during its manufacture, or retrofitted thereto after the vehicle has been placed into service. Such apparatus specifically designed for receiving the information from the tires are bulky and expensive which are found to be unsatisfactory and reliable such that they have not become widely used.

Some prior arts, for example, US 20060208865 A1 discloses a Bluetooth tire pressure monitor system. The system includes a pressure sensor, a signal emitter, a display screen and a signal receiver. The pressure sensor and emitter are integrated with a customized inflating valve and installed in the tire. The signal receiver and display screen/user interface are placed in the driver's compartment of the vehicle in a highly visible location, usually on the dashboard. The pressure sensor senses the pressure in the tire. The signal emitter collects and converts the pressure signal from the pressure sensor and transmits the signal wirelessly (using the Bluetooth protocol) to signal receiver which converts the signal and delivers it to the user interface/display screen which displays the signal. The signal receiver and display screen are shared components, signal receiver distinguishes and identifies all frequencies from the associated signal emitter of each tire first, then addresses the signals to the matching tire of display screen. The display screen, usually in the form of an adhesively attached film-shape, indicates the position and pressure condition of all tires. The condition is preferably shown in red, yellow and green colours based on the air pressure range. When the range is 76-100%, the indicating light is green, when the range is 50-75%, the indicating light is yellow and when it is lower than 50%, indicating light is red. The inflating valve of the Bluetooth Tire Pressure Monitor System includes a valve cap, a valve rod, a single direction valve, a spring, a support, the pressure sensor and the emitter, along with a battery to power the sensor and emitter.

US 20120139751 A1 provides a tire-pressure signal transmitting device, wherein said tire-pressure signal transmitting device includes a tire pressure detector mounted in a tire of a vehicle. The tire pressure detector detects pressure in the tire. A transmitting device includes a data receiver and a wireless transmitter. The data receiver receives data containing pressure of the tire detected by the tire pressure detector. The wireless transmitter is connected to the data receiver by a transmission interface. The transmission interface converts the data from the data receiver into a signal indicative of the data and transmits the signal to the wireless transmitter. The wireless transmitter sends out the signal indicative of the data. A portable electronic device receives the signal sent by the wireless transmitter, allowing a user of the portable electronic device to know the pressure of the tire.

Some conventional tire pressure monitoring system, however, show certain disadvantages such as, for example:
i. Poor frequency spectrum utilization as they involved number of frequency band for transmitting/receiving data (top down communication) within the devices.
ii. Circuit complexity, where some systems involved several components, particularly the system typically involved at least two modulation schemes, two antennas, one radio frequency transmitter and one low frequency receiver for tire sensor unit; while for the in-car unit, it typically includes at least three modulation schemes, three antennas, a radio frequency receiver and a low frequency transmitter.

iii. High current consumption due to the circuit complexity; and the in-car unit is required to manage the tire sensor unit and the communication unit.

iv. Continuous external power source is required, where the in-car unit typically requires power source from the vehicle power supply. As such, where the vehicle ignition is turned off, the system is disabled. Furthermore, some systems require the vehicle to be set in motion for a specified distance or time period before the measurements become available.

v. The inability to remotely view the measured tire parameters without accessing the vehicle and turning on the ignition. Similarly, the inability to allow multiple trusted users to remotely view the measured tire parameters simultaneously.

vi. Inefficient antennas, the antennas unable to employ efficiently due to limited tire sensor place especially at low frequency.

vii. Tire sensor inaccessibility, the tire sensor is unable to be easily replaced as the sensor usually located in the rim hole of the tire.

It is to be found that some prior arts incorporate encryption technology and internet cloud for storing all information relating the condition of the tire and the user identities; however they are merely for security reason in accessibility of the information relating to tire conditions and the user identities.

In view of these and other shortcomings, it is desirous to provide an improved wireless tire monitoring system for a vehicle which is readily configurable. The system provides safe, reliable and economical reasonable installation solutions, and yet convenient to use. The present invention also provides a monitoring system that is capable of efficiently transmitting, storing, receiving/retrieving, pairing, sharing and/or broadcasting encryption data or other related information within associated units, components/devices or users with the support of distinct server or storage media, such as internet cloud. The wireless tire monitoring system of the present invention and its combination of elements thereof will be described and/or exemplified in the detailed description.

SUMMARY OF THE INVENTION

The present invention relates to a wireless tire monitoring system for a vehicle. Accordingly, the wireless tire monitoring system includes: a) at least one sensor unit disposed at each tire of the vehicle for measuring at least one parameter relating to the condition of the tire; b) a mobile communication unit in communication with the sensor unit, or in-car unit or other associated units, components/devices (if any), and distinct server/storage media/internet cloud; c) a distinct server/storage media/internet cloud for storing all information relating to encryption key, user information/identities, or the parameters concerning to the condition of the tire measured by the sensor unit; wherein the tire monitoring system is adapted to efficiently transmitting, storing, receiving/retrieving, pairing, sharing and/or broadcasting encryption data or other related information within the associated units, components/devices with the distinct server or storage media or the internet cloud, in a parallel communication; wherein the system is optionally provided with an in-car unit in communication with the sensor unit or other associated units, components/devices (if any), the mobile communication unit and distinct server/storage media/internet cloud; and wherein the sensor unit is either wired or wireless communication with the in-car unit or other associated units, components/devices (if any), and wirelessly in communication with the mobile communication unit.

It will be appreciated that the system may optionally provide with an in-car unit in communication with the sensor unit or other associated units, components/devices (if any), the mobile communication unit and distinct server/storage media/internet cloud.

In the preferred embodiment of the present invention, the sensor unit is either wired or wireless communication with the in-car unit or other associated units, components/devices (if any), and wirelessly in communication with the mobile communication unit. By way of example but not limitation, the wireless communication of the sensor unit(s), in-car unit and the mobile communication unit is performed by using the Bluetooth Technology, such that any broadcast data/information from the sensor unit(s) is transmitted simultaneously to the in-car unit and/or the mobile communication unit via Radio Frequency (RF)/Bluetooth.

It will be appreciated that the mobile communication unit or the in-car unit involves firmware or software application ("APP"), said firmware or software application ("APP") is adapted for used in monitoring, observing and/or controlling all pairing and/or sharing functions or related information, including the encryption data or any other related information in between the sensor unit(s), in-car unit or associated units, components/devices (if any), and the distinct server/storage media/internet cloud. Accordingly, the firmware or software application ("APP") allows the user to direct the distinct server/storage media/internet cloud to share all or partially or selected information relating to encryption key, user information/identities, or the parameters concerning the condition of the tire with other trustworthy users, or to share such information from the primary mobile communication unit to other mobile communication unit or other devices without the need for such trustworthy users or mobile communication unit or other devices to reinitiate the pairing process with the sensor unit(s), in-car unit or associated units, components/devices (if any); and, in the event that the user wishes to substitute, change, or switch to other different mobile communication unit or device, to obtain all such pairing, encryption, user/identity information from the distinct server/storage media/internet cloud into the substitute mobile communication unit or device. Accordingly, the firmware or software application ("APP") allows the user to substitute, change, or switch to other different mobile communication unit or device by obtaining all pairing, encryption, user/identity information from the distinct server/storage media/internet cloud into the substitute mobile communication unit or device without the need for substitute mobile communication unit or device to reinitiate the pairing process with the sensor unit(s), in-car unit or associated units, components/devices (if any). As all such pairing, encryption, user/identity information is obtained from the distinct server/storage media/internet cloud, trustworthy users and substitute devices, as the case may be, need not reinitiate the pairing process with the sensor unit(s) (200*a*), in-car unit (300*a*) or associated units, components/devices (if any).

It should be note that the APP enables primary user to control or regulate the pairing and/or sharing functions, such that the encrypted data of the system can be picked-up by, or being paired or shared with other mobile communication units, or devices of secondary, or other trustable user's devices. Preferably, but not limited to, the firmware or software application ("APP") is pre-installed, pre-programmed, or to be downloaded from webserver/internet into non-volatile/flash memory of the mobile communication unit or the in-car unit.

In accordance with preferred exemplary of the present invention, the mobile communication unit or the in-car unit is capable of transmitting, storing, receiving/retrieving, pairing, sharing and/or broadcasting encryption data or any other related information within the system including the sensor unit(s), in-car unit or any other associated units/components/devices (if any), and the distinct server/storage media/the internet cloud.

It should also be noted that the system is adapted to avoid any violation or theft issues of the sensor unit(s) or the in-car unit by integrating or incorporating encryption between the paired units into wireless communication, where the sensor unit(s) or the in-car unit are in association with the mobile communication unit. Such violation or theft issues of the sensor unit(s) or the in-car unit will trigger such that alerting signal, either in sound, display, or vibration, or in combination thereof, will be presented on the mobile communication unit via the APP.

It will be appreciated that all encryption keys and/or user information/identities in the mobile communication unit, the in the in-car unit or other associated units/components/devices (if any) are being stored in the distinct server or storage media or the internet cloud. Accordingly, the distinct server or storage media or the internet cloud is adapted to store all parameters relating to the condition of the tire measured by the sensor unit(s), the encryption keys, user information/identities as well as other related information within the associated units, components/devices (if any). By way of example but not limitation, the parameters relating to the condition of the tire measured by the sensor unit(s) includes tire pressure, temperature, wheel speed, acceleration, and/or distance information of the vehicle.

It should be note that the system enables any faulty or missing sensor unit(s) to be replaced, such that any unpaired replacement sensor unit does not require any pre-programmed identification of its wheel position prior to being paired, and wherein the pairing of the unpaired replacement sensor unit to the wireless tire monitoring system does not require the vehicle to be set in motion. It will be appreciated that the use of the wireless tire monitoring system does not require the vehicle to be set in motion. Moreover, the mobile communication unit and the in-car unit is able to receive data/information via Bluetooth from the sensor unit(s) even when the vehicle's ignition is switched off and the vehicle is stationary indefinitely.

The present invention also provides a monitoring system adapted to efficiently transmitting, storing, receiving/retrieving, pairing, sharing and/or broadcasting encryption data or other related information within associated units, components/devices with the distinct server or storage media or internet cloud. Accordingly, the system includes: a) at least one primary mobile communication unit; b) at least one associated units, components/devices wirelessly connected with the primary mobile communication unit; c) a distinct server/storage media/the internet cloud; wherein the monitoring system involves firmware or software application ("APP") adapted for used in monitoring, observing and/or controlling all pairing and/or sharing functions or related information in between the primary mobile communication unit, associated units, components/devices, and the distinct server/storage media/internet cloud.

By way of example but not limitation, the associated units, components/devices may include sensor unit, in-car unit or other mobile communication units, or devices of secondary, or other trustable user's devices adapted to be in association with the primary mobile communication unit and/or the distinct server/storage media/internet cloud. It should be noted that the firmware or software application ("APP") allows user to direct the distinct server/storage media/internet cloud to share all or partially or selected information relating to encryption key, user information/identities, or the parameters concerning the condition of the tire with other trustworthy users, or to share such information from the primary mobile communication unit to other mobile communication unit or other devices without the need for such trustworthy users or mobile communication unit or other devices to reinitiate the pairing process with the sensor unit(s), in-car unit or associated units, components/devices (if any); and, in the event that the user wishes to substitute, change, or switch to other different mobile communication unit or device, to obtain all such pairing, encryption, user/identity information from the distinct server/storage media/internet cloud into the substitute mobile communication unit or device without the need for substitute mobile communication unit or device to reinitiate the pairing process with the sensor unit(s), in-car unit or associated units, components/devices (if any). As all such pairing, encryption, user/identity information is obtained from the distinct server/storage media/internet cloud (500*a*), trustworthy users and substitute devices, as the case may be, need not reinitiate the pairing process with the sensor unit(s) (200*a*), in-car unit (300*a*) or associated units, components/devices (if any).

It will be appreciated that the APP enables primary user to control or regulate the pairing and/or sharing functions, such that the encrypted data of the system can be picked-up by, or being paired or shared with other mobile communication units, or devices of secondary, or other trustable user's devices. By way of example but not limitation, the firmware or software application ("APP") is pre-installed, pre-programmed, or to be downloaded from webserver/internet into non-volatile/flash memory of the primary mobile communication unit or associated units, components/devices.

In the preferred exemplary, the all encryption keys and/or user information/identities in the mobile communication unit, and other associated units/components/devices are being stored in the distinct server or storage media or the internet cloud. The system is also adapted to avoid any violation or theft issues of the associated units/components/devices by integrating or incorporating encryption between the paired units into wireless communication, such that the associated units/components/devices are in association with the mobile communication unit.

The present invention consists of several novel features and a combination of parts hereinafter fully described and illustrated in the accompanying description and drawings, it being understood that various changes in the details may be made without departing from the scope of the invention or sacrificing any of the advantages of the present invention.

BRIEF DESCRIPTION OF THE DRAWINGS

The present invention will be fully understood from the detailed description given herein below and the accompanying drawings which are given by way of illustration only, and thus are not limitative of the present invention, wherein.

DETAILED DESCRIPTION OF THE PREFERRED EMBODIMENTS

The present invention relates to a wireless tire pressure/temperature monitoring system for a vehicle. The present invention also provides a monitoring system that is capable of efficiently transmitting, storing, receiving/retrieving, pairing, sharing and/or broadcasting encryption data or other related information within associated units, components/devices with distinct server or storage media, such as internet cloud. Hereinafter, this specification will describe the present invention according to the preferred embodiments of the present invention. However, it is to be understood that limiting the description to the preferred exemplary embodiments of the invention is merely to facilitate discussion of the present invention and it is envisioned that those skilled in the art may devise various modifications and equivalents without departing from the scope of the appended claims.

The wireless tire monitoring system according to the preferred mode of carrying out the present invention will now be described in accordance to the accompanying drawings FIGS. 1a to 6, either individually or in any combination thereof.

Figure 1A:
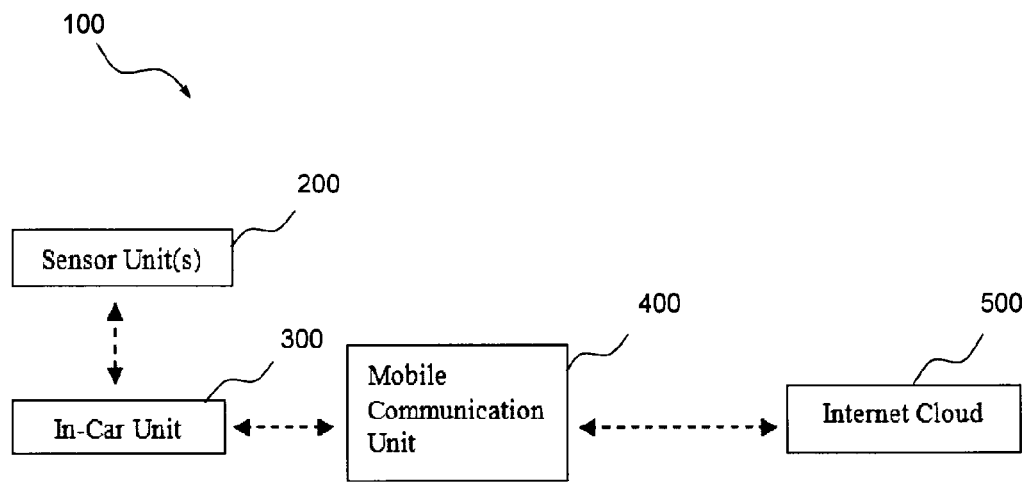
FIG. 1a is a block diagram illustrating a wireless tire monitoring system in accordance with one preferred exemplary embodiment of the present invention.

With reference to FIG. 1a, the wireless tire monitoring system (100) generally includes sensor unit(s) (200), in-car unit (300), a mobile communication unit (400) and an internet cloud (500) in accordance with one preferred exemplary embodiment of the present invention.

Accordingly, the system includes at least one sensor unit (200) for measuring at least one parameter relating to the condition of the tire. Preferably, the sensor unit (200) is disposed at each tire of a vehicle such that it enables to provide a reading or parameter relating to, for example, the tire pressure, temperature, wheel speed, acceleration, and/or distance information of the vehicle. It will be appreciated that the sensor unit (200) may be disposed inside the tire or at a valve stem of the tire.

The system is further provided with a mobile communication unit (400) which is capable of being wirelessly in communication with either the sensor unit (200) or the in-car unit (300). By way of example but not limitation, the mobile communication unit (400) may be a smartphone, cellular or mobile phone, smart tablet, computer, laptop, personal digital assistants or any smart devices and the like.

It should be noted that the mobile communication unit (400) involves a firmware or software application ("APP") that is adapted for monitoring, observing and/or controlling all related pairing information in between the sensor unit(s) (200), or the in-car unit (300), and the internet cloud (500). It will be appreciated that the sensor unit (200) and the in-car unit (300) may be communicated by either wired or wireless communication. By way of example but not limitation wireless communication between the sensor unit (200) and the in-car unit (300) is may be performed by wire connection or by using Bluetooth Technology. The system also enables the wireless communication between the mobile communication unit (400) and the sensor unit (200) or the in-car unit (300) using the Bluetooth Technology.

Figure 1B:
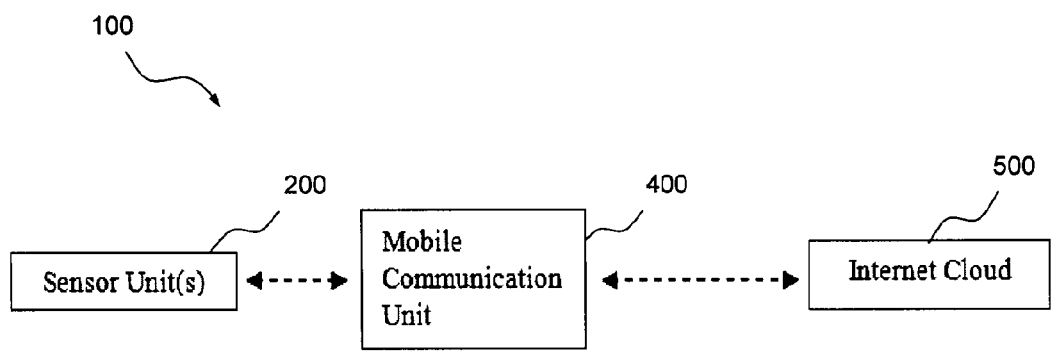
FIG. 1b is a block diagram illustrating a wireless tire monitoring system in accordance with another preferred exemplary embodiment of the present invention.

It will be appreciated that the wireless tire monitoring system (100) also enables wireless communications between the sensor unit (200) and the mobile communication unit (400), without the need of having the in-car unit (300) as shown in FIG. 1b. Accordingly, the wireless communication between the mobile communication unit (400) and the sensor unit (200) is performed by using the Bluetooth Technology.

In the preferred exemplary embodiment of the present invention, the wireless tire monitoring system (100) is capable of integrating or incorporating encryption between the units into the wireless communication such that to ensure the sensor unit(s) (200) or the in-car unit (300) are in association with the mobile communication unit (400). This is to avoid any violation or theft issues of the sensor unit(s) (200), especially for those sensor unit(s) (200) disposed or attached to the valve stem of the tire. It should be noted that each sensor unit (200) is capable of broadcasting encrypted data such that it can be picked up by any devices or other mobile communication units. It will be appreciated that, the sensor unit (200) is encrypted so that other mobile communication units or devices without the encryption key will not be able to pair with the sensor unit (200) and to read the data. By default, the in-car unit (300) may pick up the encrypted data from the sensor unit(s) (200).

It will be appreciated that all encryption keys and/or user information/identities in the mobile communication unit (400) are preferably stored in the internet cloud (500). If desired, the internet cloud (500) may serve to store all parameters relating to the condition of the tire measured by the sensor unit (200). As such, the user is able to retrieve the encryption keys and continue to work with the system should the user change or use a different mobile communication unit (400). By the way of example but not limitation, the wireless communication between the mobile communication unit (400) and the internet cloud (500) may be by way of WiFi, near field communication (NFC), cellular network, or any other wireless or Radio Frequency (RF) connection.

Figure 2:
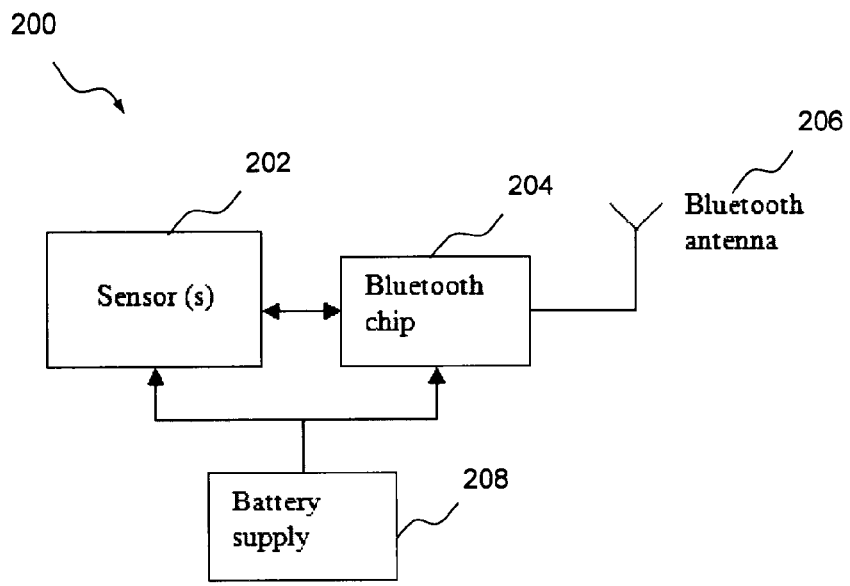
FIG. 2 shows a block diagram of a sensor unit of the wireless tire monitoring system according to preferred exemplary of the present invention.

Referring now to FIG. 2, there is shown and illustrated a block diagram of the sensor unit (200) of the wireless tire monitoring system (100) in accordance with preferred exemplary embodiment of the present invention. The sensor unit (200) has pairing capability to enable it to pair with other associated units in the system. Accordingly, sensor unit (200) includes sensor(s) (202) which is preferably disposed inside the tire, or at the valve stem of the tire. The sensor unit (200) is further provided with a Bluetooth antenna (206) connected to a Bluetooth chip (204) for Bluetooth pairing and communications, and the said sensor unit (200) is preferably battery powered (208).

Figure 3:
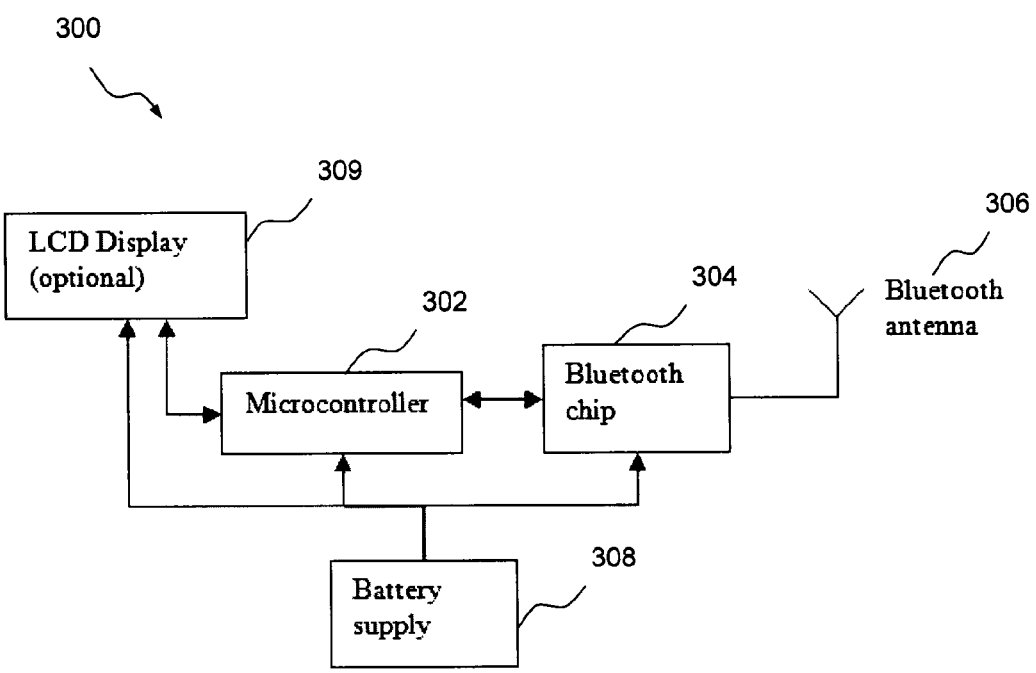
FIG. 3 shows a block diagram of an in-car unit of the wireless tire monitoring system according to preferred exemplary of the present invention.

FIG. 3 shows a block diagram of the in-car unit (300) of the wireless tire monitoring system (100) according to preferred exemplary embodiment of the present invention. It will be appreciated that the in-car unit (300) also has pairing capabilities to enable it to pair with other associated units in the system. Optionally, the in-car unit (300) may be a built-in unit or a separate unit disposed at the dashboard of the vehicle. The in-car unit (300) is provided with a Bluetooth antenna (306) connected to a Bluetooth chip (304) for Bluetooth pairing and communications, and the said in-car unit (300) is preferably battery powered (308). It should be noted that the in-car unit (300) further includes a microcontroller (302) for processing all related information received from the sensor unit(s) (200). If required, the in-car unit (300) is optionally provided with a display (309) for displaying all reading, information or parameter relating to the condition of the tire.

The pairing of the sensor unit(s) (200), the in-car unit (300) and the mobile communication unit (400) will now be described. Accordingly, the pairing process may initiate in the event that a user registers and logs in into an account through the firmware or software application ("APP") of the mobile communication unit (400). After a successful login, the APP will obtain a specific and unique encryption key from the internet cloud (500). It should be noted that only after successful login, the user can start using the APP.

It will be appreciated that the pairing process may be triggered or activated for any unpaired sensor (202), for example but not limited to, by attaching it to the tire's valve stem. The unpaired sensor (202) will then transmit Bluetooth signal to allow the mobile communication unit (400) to identify or detect it. Accordingly, the APP in the mobile communication unit (400) will scan/find the unpaired sensor (202). The APP will trigger or activate a Bluetooth connection with the sensor (202) as soon as the said sensor (202) is found. After a successful Bluetooth connection is established, the APP of the mobile communication unit (400) will send a unique encryption key to the sensor unit (200).

As for the in-car unit (300), the user may trigger or activate a pairing mode, for example but not limiting, by pressing and holding a designated button on the in-car unit (300). As soon as the pairing mode is trigger, the in-car unit (300) will then transmit Bluetooth signal to allow the mobile communication unit (400) to identify or detect it. Similarly, the APP in the mobile communication unit (400) will scan/find the in-car unit (300). The APP will trigger or activate a Bluetooth connection with the in-car unit (300) as soon as the in-car unit (300) is found. After a successful Bluetooth connection is established, the APP of the mobile communication unit (400) will send the unique encryption key to the in-car unit (300).

It will be appreciated that the successful pairing of the sensor unit(s) (200), the in-car unit (300) and the mobile communication unit (400) will share the same encryption key and to be used for communication in the system.

As for the communication between the sensor unit(s) (200), the in-car unit (300) and the mobile communication unit (400), it will be appreciated that the sensor unit (200) will transmit the encrypted measured data (for example the tire's pressure, temperature, wheel speed, acceleration and/or distance information) via a Bluetooth broadcast mode simultaneously to the mobile communication unit (400) and the in-car unit (300).

The in-car unit (300) will continue to scan the transmitted data from the sensor unit (200) and decrypt it to obtain the actual data. At the same time, the in-car unit (300) is connected to the mobile communication unit (400) via Bluetooth technology. Accordingly, the in-car unit (300) will send the encrypted data obtained from the sensor unit (200) to the APP of the mobile communication unit (400).

In the event that the in-car unit (300) does not exist or is not present in the system (for example, it could be damaged or spoilt, or the user opts to not installing the in-car unit, etc.), the APP of the mobile communication unit (400) will then scan the transmitted data from the sensor unit (200). Accordingly, in the absent or default of the in-car unit (300), the mobile communication unit (400) will directly pick up the signals from the sensor unit(s) (200).

Figure 4:
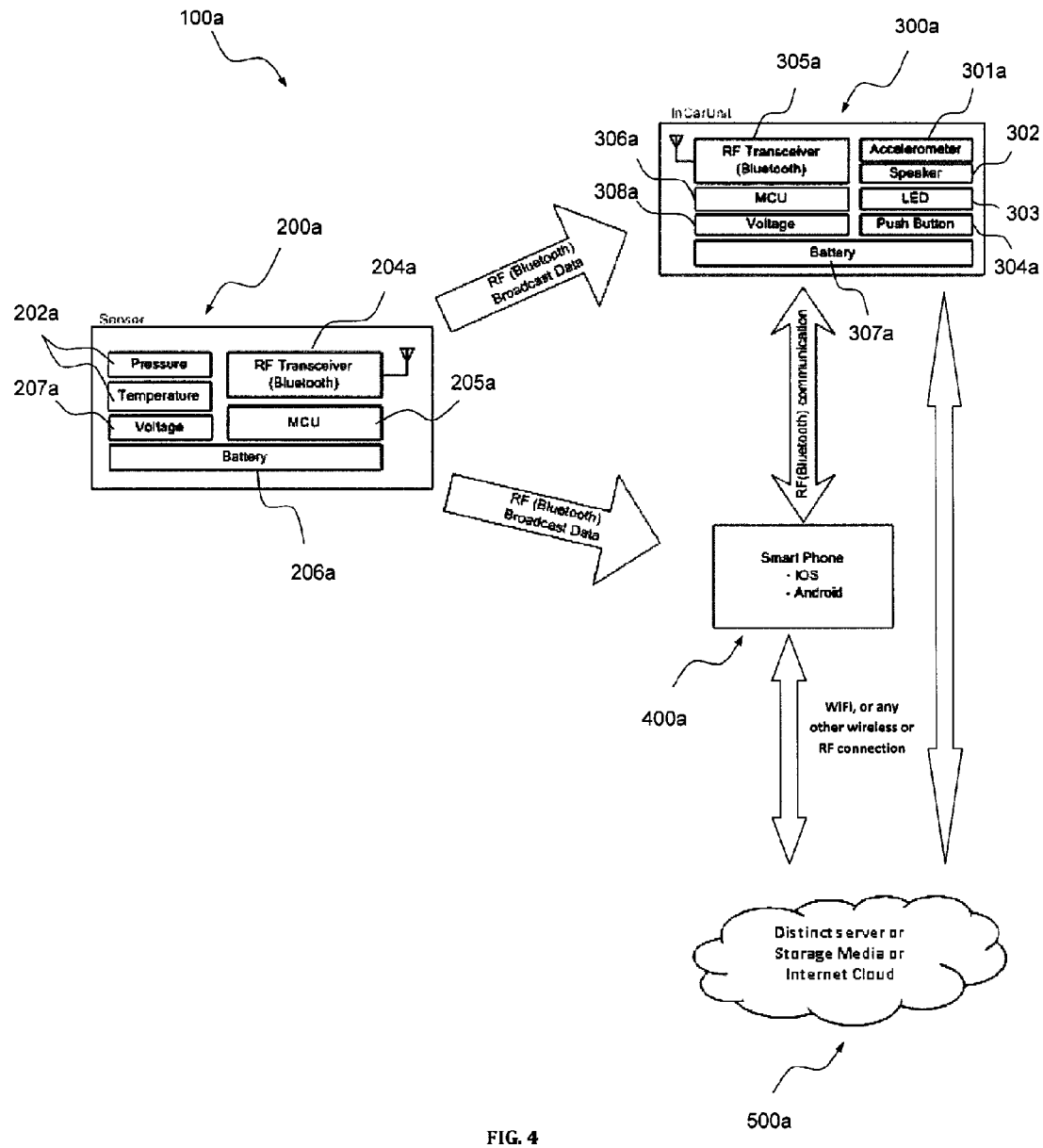
FIG. 4 shows a block diagram illustrating wireless tire monitoring system in accordance with another preferred exemplary of the present invention.

FIG. 4 shows a block diagram illustrating wireless tire monitoring system (100a) in accordance with another preferred exemplary of the present invention. Accordingly, the wireless tire monitoring system (100a) includes sensor unit (s) (200a), in-car unit (300a), mobile communication unit (400a), and distinct server/storage media/internet cloud (500a). It should be noted that the said monitoring system (100a) is capable of efficiently transmitting, storing, receiving/retrieving, pairing, sharing and/or broadcasting encryption data or other related information within the associated units, components/devices with distinct server or storage media, such as, for example, but not limited to the internet cloud (500a), in a parallel communication.

In this preferred exemplary, the sensor unit(s) (200a) may be either wired or wireless communication with the in-car unit (300a), and wirelessly in communication with the mobile communication unit (400a). The in-car unit (300a) may be wirelessly in communication with the mobile communication unit (400a), or other associated units, components/devices (if any) in the system. By way of example but not limitation, the wireless communication of the sensor unit(s) (200a), in-car unit (300a) and the mobile communication unit (400a) may be performed by using the Bluetooth Technology, such that any broadcast data/information from the sensor unit(s) (200a) may be transmitted to the in-car unit (300a) or the mobile communication unit (400a) via Radio Frequency (RF)/Bluetooth. If desired, the in-car unit (300a) may also be capable of wirelessly in communication with the distinct server or storage media or the internet cloud (500a). Similarly, in the event that the in-car unit (300a) does not exist or is not present in the system, the APP of the mobile communication unit (400a) will then scan the transmitted data from the sensor unit (200a). Accordingly, in the absent or default of the in-car unit (300a), the mobile communication unit (400a) will directly pick up the signals from the sensor unit(s) (200a).

It will be appreciated that the mobile communication unit (400a) or the in-car unit (300a) may involve firmware or software application ("APP"). Accordingly, said firmware or software application ("APP") is adapted for used in monitoring, observing and/or controlling all pairing and/or sharing functions or other related information, including, but not limited to, the encryption data or any other related information in between the sensor unit(s) (200a), in-car unit (300a) or associated units, components/devices (if any), and the distinct server/storage media/internet cloud (500a). Accordingly, the monitoring system (100a) enables a primary user to direct the distinct server/storage media/internet cloud (500a) to share all or partially or selected information with other user, including the broadcasting encryption data or any other related information in the system; or to share such information from primary mobile communication unit (400a) to other mobile communication unit or other devices without the need for such trustworthy users or mobile communication unit or other devices to reinitiate the pairing process with the sensor unit(s) (200a), in-car unit (300a) or associated units, components/devices (if any); and in the event that the user wishes to substitute, change, or switch to other different mobile communication unit, to obtain all such pairing, encryption, user/identity information from the distinct server/storage media/internet cloud (500a) into the substitute mobile communication unit or device without the need for substitute mobile communication unit or device (400a) to reinitiate the pairing process with the sensor unit(s) (200a), in-car unit (300a) or associated units, components/devices (if any). As all such pairing, encryption, user/identity information is obtained from the distinct server/storage media/internet cloud (500a), trustworthy users and substitute devices, as the case may be, need not reinitiate the pairing process with the sensor unit(s) (200a), in-car unit (300a) or associated units, components/devices (if any).

It will be appreciated that the firmware or software application ("APP") may be pre-installed, pre-programmed, or to be downloaded from webserver/internet into non-volatile/flash memory of the mobile communication unit (400a) or the in-car unit (300a). In the preferred exemplary, the mobile communication unit (400a) or the in-car unit (300a) is adapted to be wirelessly connected with the distinct server or storage media or the internet cloud (500a) via Radio Frequency (RF) connection such as, for example, but not limited to WiFi or any other wireless connection. By way of example, but not limitation, the mobile communication unit (400a) may be a smartphone, cellular or mobile phone, smart tablet, IOS, Android, laptop personal digital assistants, or any other smart devices and the like. The in-car unit (300a) may be a transmission interface which can be either equipped at or placed on the dashboard of the vehicle.

In the preferred exemplary, the mobile communication unit (400a) or the in-car unit (300a) is capable of monitoring, observing and/or controlling all related information within the system (100a). In particular, the mobile communication unit (400a) or the in-car unit (300a) is capable of transmitting, storing, receiving/retrieving, pairing, sharing and/or broadcasting encryption data or any other related information within the system including the sensor unit(s) (200a), in-car unit (300a) or any other associated units/components/devices (if any), and the distinct server/storage media/the internet cloud (500a).

It should be noted that any violation or theft issues of the sensor unit(s) (200a) or the in-car unit (300a) of the monitoring system (100a) can be avoided by integrating or incorporating encryption between the paired units into wireless communication, where the sensor unit(s) (200a) or the in-car unit (300a) are in association with the mobile communication unit (400a). Any violation or theft issues of the sensor unit(s) (200a) or the in-car unit (300a) will trigger such that alerting signal, either in sound, display, or vibration, or in combination thereof, will be presented on the mobile communication unit (400a) via the APP. Each sensor unit (200a) or the in-car unit (300a) is capable of broadcasting encrypted data so that they can be picked up by, or being paired or shared with any devices or other mobile communication units. The sensor unit (200a) or the in-car unit (300a) is encrypted so that other mobile communication units or other devices without the encryption key will not be able to pair with the sensor unit (200a) or the in-car unit (300a), and to read the data. By default, the in-car unit (300a) may pick up or pair the encrypted data from the sensor unit(s) (200a) via the distinct server or storage media or the internet cloud (500a).

It will be appreciated that all encryption keys and/or user information/identities in the mobile communication unit (400a) or in the in-car unit (300a) are preferably stored in the distinct server or storage media, such as, for example, but not limited to the internet cloud (500a). By way of example but not limitation, the distinct server or storage media or the internet cloud (500) may serve to store all parameters relating to the condition of the tire measured by the sensor unit(s) (200a), the encryption keys, user information/identities as well as other related information within the associated units, components/devices (if any). The parameters relating to the condition of the tire measured by the sensor unit(s) (200a) may be, for example, but not limited to the tire pressure, temperature, wheel speed, acceleration, and/or distance information of the vehicle. It should be noted that the user is able to retrieve the encryption keys and continue to work with the monitoring system (100a) should the user wishes to substitute, change or switch to different mobile communication unit. If desired, the monitoring system (100a) also allows all or partially or selected information relating to encryption key, user information/identities, or the parameters concerning the condition of the tire to be shared with other trustworthy users through the firmware or software application ("APP") that is being pre-installed or being downloaded from the webserver/internet into the mobile communication unit. When other trustworthy users' mobile communication unit receives all or partially or selected information relating to the encryption key, their mobile communication unit would be able to receive and decode the encrypted measured data (for example the tire's pressure, temperature, wheel speed, acceleration and/or distance information) from the sensor unit (200a) and in-car unit (300a) via Bluetooth without requiring any pairing to be done. The primary user is still able to continue receive the encrypted measured data (for example the tire's pressure, temperature, wheel speed, acceleration and/or distance information) from the sensor unit (200a) and in-car unit (300a) via Bluetooth concurrently with other trustworthy user. Accordingly, the APP enables primary user to control or regulate the pairing and/or sharing functions, such that the encrypted data of the system may be picked-up by, or being paired or shared with other mobile communication units, or devices of secondary, or other trustable user's devices.

Figure 5:
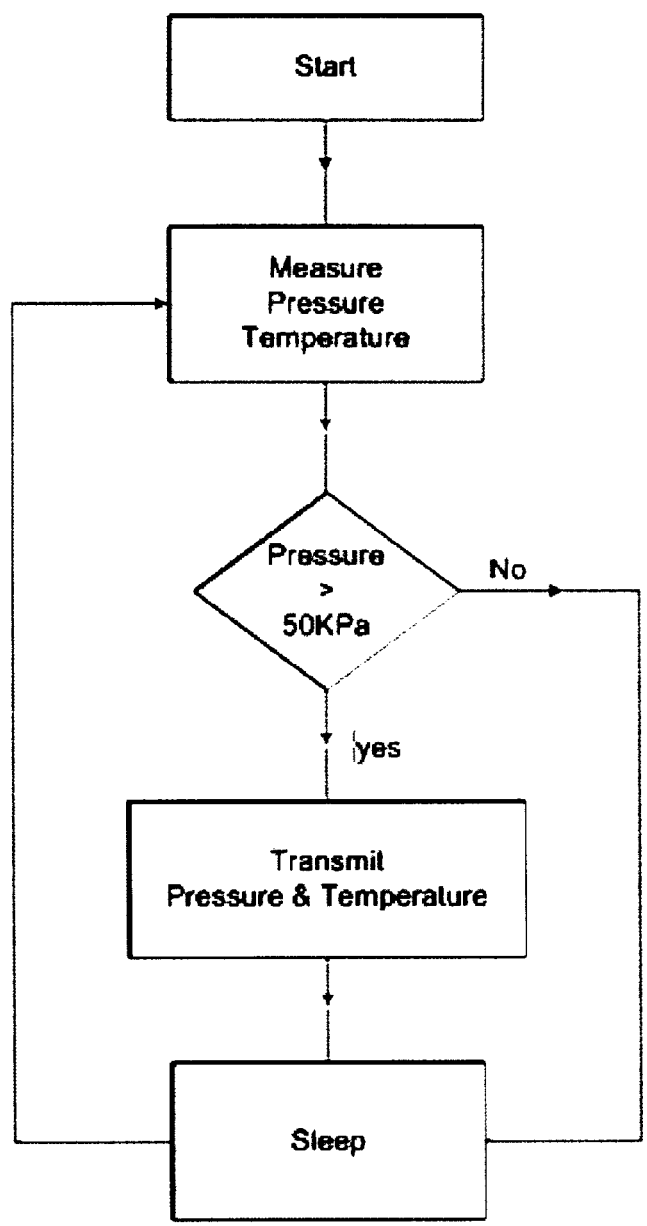
FIG. 5 shows a flow chat of a sensor unit of the wireless tire monitoring system as shown in FIG. 4 according to the preferred exemplary of the present invention.

In the preferred exemplary of the present invention, the sensor unit (200a) has pairing capability to enable it to be paired with other associated units in the system (100a). Accordingly, sensor unit (200a) may include sensor(s) (202a) for detecting the pressure and temperature of the tire. It will be appreciated that other parameter such as wheel speed, acceleration, and/or distance information of the vehicle may also be detected by the sensor unit (200a) of the system depending on the model, design requirements, or market demands. By way of example but not limitation, the sensor unit (200a) may preferably be disposed inside the tire, or at the valve stem of the tire. In the preferred exemplary, the sensor unit (200a) may further equipped with an antenna for Radio Frequency (RF) or Bluetooth transceiver (204a) that is adapted for pairing and in communications with the in-car unit (300a), any other associated units/components/devices (if any), or the mobile communication unit (400a). It should be noted that the sensor unit (200) is provided with a microcontroller (205a), such that pairing function, transmitting, sharing and/or broadcasting encryption data or any other related information within the system are being processed or controlled by the microcontroller (205a). It will be appreciated that the sensor unit (200a) is preferably battery (206a) powered to supply sufficient voltage (207a) to the sensor unit (200a). FIG. 5 which is self-explanatory shows a flow chat illustrating a fundamental operating mode of the sensor unit (200a) in accordance with one of the preferred exemplary of the present invention. It will be appreciate that any tire's pressure, for example, less than 50 KPa will be transmitted to the associated units to alert the user; otherwise it will be in sleep mode.

Figure 6:
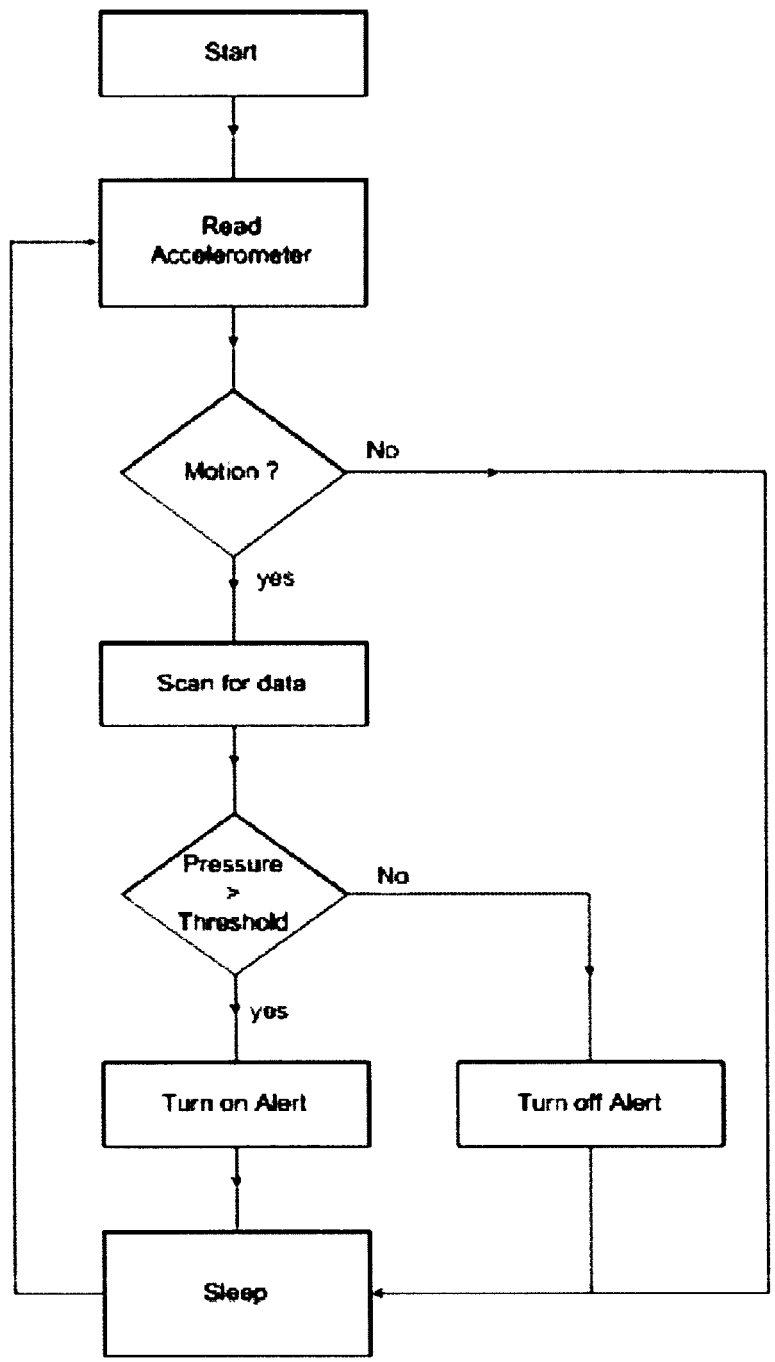
FIG. 6 shows a flow chat of an in-car unit of the wireless tire monitoring system as shown in FIG. 4 according to the preferred exemplary of the present invention.

The in-car unit (300a) also has pairing capabilities to enable it to pair with the sensor unit (200a), mobile communication unit (400a) or the other associated units (if any) in the system. Accordingly, the in-car unit (300a) may be equipped with, but not limited to, accelerometer (301a), speaker (302a), LED (303a) and push button (304a) depending upon the design requirements, materials and manufacturing costs. By way of example but not limitation, the in-car unit (300a) may be a built-in unit or a separate unit disposed at the dashboard of the vehicle. In the preferred exemplary, the in-car unit (300a) may further provided with an antenna for Radio Frequency (RF) or Bluetooth transceiver (305a) that is adapted for pairing and in communications with the sensor unit (200a), any other associated units/components/devices (if any), the mobile communication unit (400a), distinct server or storage media or the internet cloud (500a). The in-car unit (300a) is also provided with a microcontroller (306a), such that pairing function, transmitting, sharing and/or broadcasting encryption data or any other related information within the system may be processed or controlled by the microcontroller (306a). The in-car unit (300a) may also be battery (307a) powered so that it is capable to supply sufficient voltage (308a) to the in-car unit (300a). If desired, the in-car unit (300) may optionally provide with a display to exhibit all reading, sharing or related information, or parameter relating to the condition of the tire. FIG. 6 which is self-explanatory shows a flow chat illustrating a fundamental operating mode of the in-car unit (300a) in accordance with one of the preferred exemplary of the present invention. It will be appreciate that any tire's pressure, for example, less than threshold will be transmitted to the associated units to alert the user; otherwise it will be in sleep mode.

The pairing of the sensor unit(s) (200a), the in-car unit (300a) and the mobile communication unit (400a) may substantially similar to that previously discussed. Accordingly, the pairing process may initiate in the event that a user registers and logs in into an account through the firmware or software application ("APP") of in-car unit (300a) or the mobile communication unit (400a). After a successful login, the APP will obtain a specific and unique encryption key from the distinct server or storage media or the internet cloud (500). It should be noted that only after successful login, the user can start using the APP. It should be noted that the APP also allows the user to share all or partially or selected information relating to encryption key, user information/identities, or the parameters concerning the condition of the tire with other trustworthy users, or to share such information from the primary mobile communication unit (400a) to other mobile communication unit or other devices, in the event that the user wishes to substitute, change, or switch to other different mobile communication unit or device.

Similarly, the pairing process may be triggered or activated for any unpaired replacement sensor unit(s) (200a), which is disposed inside the tire, or attached at the valve stem of the tire to be added to the wireless tire pressure monitoring system (100a) to replace faulty or missing sensors unit(s) (200a). Unpaired replacement sensors unit(s) (200a) does not require to be pre-programmed with the identification of its wheel position (for example Front-Right or Rear-Left) prior to being paired to the wireless tire pressure monitoring system (100a). Also the pairing process may be triggered or activated for any unpaired replacement sensor unit(s) (200a) without having to set the vehicle in motion. The unpaired replacement sensor unit(s) (200a) will then transmit Bluetooth signal to allow the in-car unit (300a) or the mobile communication unit (400a) to identify or detect it. Accordingly, the APP in the mobile communication unit (400a) will scan/find the unpaired sensor unit(s) (200a). The APP will trigger or activate a Bluetooth connection with the sensor unit(s) (200a) as soon as the sensor unit (200a) is found. After a successful Bluetooth connection is established, the APP of the in-car unit (300a) or mobile communication unit (400a) will send a unique encryption key to the sensor unit(s) (200a). If will be appreciated that the mobile communication unit (400a) and the in-car unit (300a) is able to receive data/information via Bluetooth from the sensor unit(s) (200a) even when the vehicle's ignition is switched off and the vehicle is stationary indefinitely.

Some advantages of the tire pressure monitoring system (100a) are listed below:
  i. Parallel communication
      The mobile communication unit (400a) is able to receive data/information directly from the sensor unit(s) (200a) without requiring an intermediate interface between the mobile communication unit (400a) and the sensor unit(s) (200a);
    Reliable communication:
      even if the in-car unit (300a) is faulty or not functioning, the mobile communication unit (400a) would still be able to receive data/information from the sensor unit(s) (200a);
      even if the mobile communication unit (400a) is faulty or not functioning, the in-car unit (300a) would still be able to receive data/information from the sensor unit(s) (200a)
    Good frequency spectrum utilization, all communication in one frequency
  ii. Simple pairing of sensor unit(s) (200a) including replacement sensor units(s) (200a) to the wireless tire pressure monitoring system (100a) without having the sensor unit(s) pre-programmed with the identification of its wheel position or setting the vehicle in motion
  iii. Multiple mobile communication unit (400a) is able to receive data/information from the sensor unit(s) (200a) and/or the in-car unit (300a) simultaneously via Bluetooth
  iv. Simple circuit
    Only one Radio Frequency transceiver (Bluetooth)
  v. Low current consumption
    Sensor unit(s) (200a) only maintain single Radio Frequency transceiver;
    No high power amplifier is needed for the in-car unit (300a) as there is no low frequency (LF) transmitter;
    The in-car unit (300a) is in sleep mode most of the time, only in operating mode or wake up by accelerometer
  vi. Independent power supply
    In-car unit (300a) preferably, but not limiting, used commonly external AA battery as power source
  vii. Efficient antenna
    Due to high frequency
  viii. Easily accessable of sensor unit
    Faulty or end of battery life of the sensor unit (200a) can be easily replaceable
  ix. 24 hours/7 days monitoring
    Continuing non-stop monitoring of the tire pressure where the mobile communication unit (400a) and/or the in-car unit (300a) is able to continue receiving data/information from the sensor unit (s) (200a) via Bluetooth even after the vehicle's ignition is switched off and the vehicle is stationary indefinitely.

It should be noted that the arrangements or configurations of various units, components and/or elements used to carry out the above-mentioned embodiments are illustrative and exemplary only, and are not restrictive of the invention. One of ordinary skill in the art would recognize that those arrangements or configurations, components and/or elements used herein may be altered in a manner so as to obtain different effects or desired operating characteristics. As such, the above-described should not be construed as limiting in any way, but as a best mode contemplated by the inventor for carrying out the invention.

The invention being thus described, it will be obvious that the same may be varied in many ways. Such variations are not to be regarded as a departure from the principle and scope of the invention, and all such modifications as would obvious to one skilled in the art intended to be included within the scope of following claims.

The invention claimed is:

1. A wireless tire monitoring system for a vehicle, the wireless tire monitoring system including:
    a) at least one sensor unit disposed at each tire of the vehicle for measuring at least one parameter relating to the condition of the tire;
    b) a mobile communication unit in communication with the sensor unit, or in-car unit or other associated units, components/devices (if any), and distinct server/storage media/internet cloud; and
    c) the distinct server/storage media/internet cloud for storing all information relating to encryption data, user information/identities, or the parameters concerning to the condition of the tire measured by the sensor unit;
    wherein the tire monitoring system is adapted for efficiently transmitting, storing, receiving/retrieving, pairing, sharing and/or broadcasting encryption data or other related information within the at least one sensor unit, or in-car unit or other associated units, components/devices with the mobile communication unit and the distinct server or storage media or the internet cloud, in a parallel communication;
    wherein the mobile communication unit or the in-car unit involves a firmware or software application that is adapted for use in monitoring, observing and/or controlling all pairing and/or sharing functions or related information, including the encryption data or any other related information in between the at least one sensor unit, or the in-car unit or other associated units, components/devices (if any), and the distinct server/storage media/internet cloud, such that the firmware or software application allows the user to substitute, change, to switch to other different mobile communication unit or device, or share with other mobile communication unit or device, by obtaining all pairing, encryption data, user/identity information, or parameters concerning to the condition of the tire from the distinct server or storage media or internet cloud into the substitute or other mobile communication unit or device without the need for reinitiating the pairing process with the sensor unit(s), or the in-car unit or other associated units, components/devices (if any).

2. The wireless tire monitoring system according to claim 1, wherein the wireless communication of the at least one sensor unit, in-car unit or the mobile communication unit is performed by using the Bluetooth Technology, such that any broadcast data/information from the at least one sensor unit is transmitted simultaneously to the in-car unit and/or the mobile communication unit via Radio Frequency (RF)/Bluetooth.

3. The wireless tire monitoring system according to claim 1, wherein the firmware or software application allows the user to direct the distinct server/storage media/internet cloud to share all or partially or selected information relating to encryption key, user information/identities, or the parameters concerning the condition of the tire with other trustworthy users, or to share such information from the primary mobile communication unit to other mobile communication unit or other devices without the need for such trustworthy users or mobile communication unit or other devices to reinitiate the pairing process with the sensor unit(s), in-car unit or associated units, components/devices (if any).

4. The wireless tire monitoring system according to claim 3, wherein the firmware or software application enables primary user to control or regulate the pairing and/or sharing functions, such that the encrypted data of the system is picked-up by, or being paired or shared with other mobile communication units, or devices of secondary, or other trustable user's devices.

5. The wireless tire monitoring system according to claim 1, wherein the firmware or software application is pre-installed, pre-programmed, or to be downloaded from web-server/internet into non-volatile/flash memory of the mobile communication unit or the in-car unit.

6. The wireless tire monitoring system according to claim 1, wherein the mobile communication unit or the in-car unit is capable of transmitting, storing, receiving/retrieving, pairing, sharing and/or broadcasting encryption data or any other related information within the system including the at least one sensor unit, in-car unit or any other associated units/components/devices (if any), and the distinct server/storage media/the internet cloud.

7. The wireless tire monitoring system according to claim 1, wherein system is adapted to avoid any violation or theft issues of the at least one sensor unit or the in-car unit by integrating or incorporating encryption between the paired units into wireless communication, where the at least one sensor unit or the in-car unit are in association with the mobile communication unit.

8. The wireless tire monitoring system according to claim 7, wherein violation or theft issues of the at least one sensor unit or the in-car unit will trigger such that alerting signal, either in sound, display, or vibration, or in combination thereof, is presented on the mobile communication unit via the firmware or software application.

9. The wireless tire monitoring system according to claim 1, wherein all encryption keys and/or user information/identities in the mobile communication unit, the in the in-car unit or other associated units/components/devices (if any) are being stored in the distinct server or storage media or the internet cloud.

10. The wireless tire monitoring system according to claim 1, wherein the distinct server or storage media or the internet cloud is adapted to store all parameters relating to the condition of the tire measured by the at least one sensor unit, the encryption keys, user information/identities as well as other related information within the associated units, components/devices (if any).

11. The wireless tire monitoring system according to claim 1, wherein the parameters relating to the condition of the tire measured by the at least one sensor unit includes tire pressure, temperature, wheel speed, acceleration, and/or distance information of the vehicle.

12. The wireless tire monitoring system according to claim 1, wherein the system enables any faulty or missing sensor unit to be replaced, such that any unpaired replacement sensor unit does not require any pre-programmed identification of its wheel position prior to being paired, and wherein the pairing of the unpaired replacement sensor unit to the wireless tire monitoring system does not require the vehicle to be set in motion.

13. The wireless tire monitoring system according to claim 1, wherein the use of the wireless tire monitoring system does not require the vehicle to be set in motion.

14. The wireless tire monitoring system according to claim 1, wherein the mobile communication unit or the in-car unit is able to receive data/information via Bluetooth from the at least one sensor unit even when the vehicle's ignition is switched off and the vehicle is stationary indefinitely.

* * * * *